C. H. BOWDITCH.
CORNICE LOCK FOR CAROUSELS.
APPLICATION FILED MAR. 31, 1916.
1,230,104.  Patented June 19, 1917.
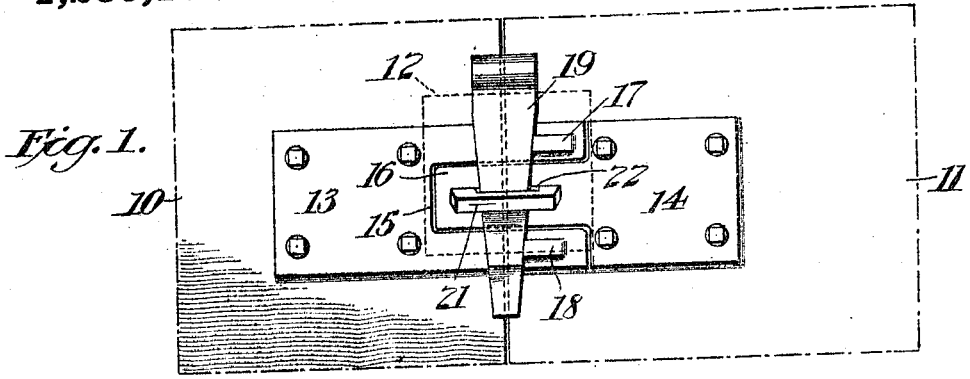
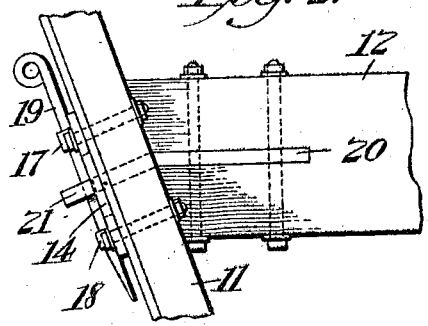
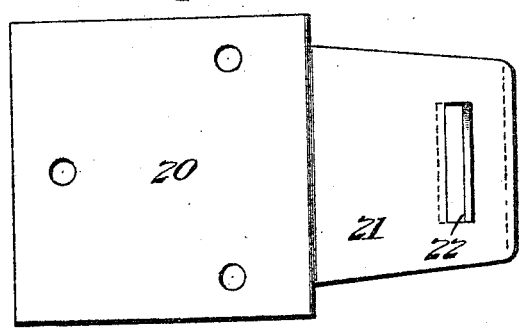
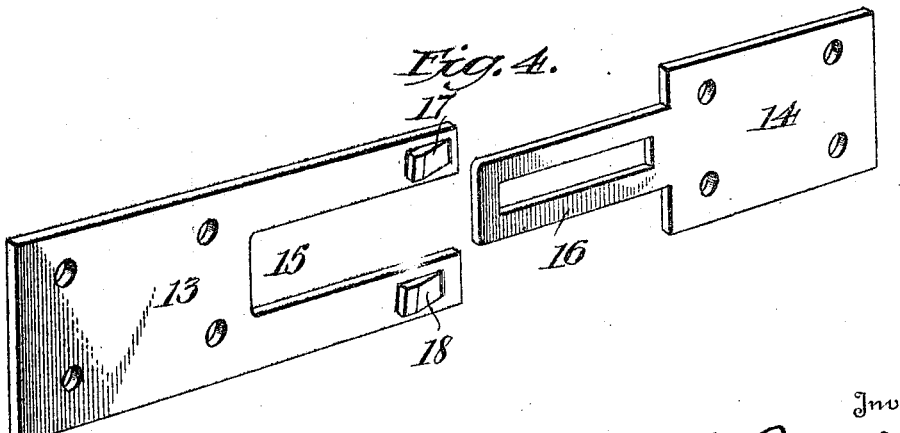
Inventor
C. H. Bowditch
By
Walter T. Rogers
Attorney

UNITED STATES PATENT OFFICE.

CHARLES H. BOWDITCH, OF ERDENHEIM, PENNSYLVANIA, ASSIGNOR TO HENRY B. AUCHY, OF ERDENHEIM, PENNSYLVANIA.

CORNICE-LOCK FOR CAROUSELS.

1,230,104.                  Specification of Letters Patent.      Patented June 19, 1917.

Application filed March 31, 1916. Serial No. 87,950.

*To all whom it may concern:*

Be it known that I, CHARLES H. BOWDITCH, a citizen of the United States, residing at Erdenheim, in the county of Montgomery and State of Pennsylvania, have invented certain new and useful Improvements in Cornice-Locks for Carousels; and I do hereby declare the following to be a full, clear, and exact description of the invention, such as will enable others skilled in the art to which it appertains to make and use the same.

My invention relates to carousels and especially to a lock for joining the sectional cornice rim and bearing arm of a carousel. Its object is to provide an easily assembled lock so that the two sections of the rim and the carousel arm may be quickly joined together and as quickly taken apart. To this end it comprises the combination of parts recited in the appended claims.

In the drawings:—

Figure 1 is a side elevation of the junction of the carousel arm and the rim cornice indicating the arm in dotted lines;

Fig. 2 is a side elevation of the arm and cornice when brought together with my lock applied;

Fig. 3 is a plan view of a plate provided with a tongue which projects from the carousel arm; and Fig. 4 represents complementary locking plates with which the plate tongue engages.

In the drawings 10 and 11, respectively, represent opposing sections of a cornice rim. 12 represents a carousel arm, that is to say, the bearing arm which carries the operating parts of a carousel. 13 and 14 represent opposing or complementary parts which fitted together form a locking plate. Both parts are provided with bolt holes for attachment to the opposing sections of the cornice rim. The part 13 is cut away or recessed at 15 to receive a slotted tongue 16 of the part 14. The part 13 also bears two projections 17 and 18 whose faces are out of alinement so as to be both engaged by one of the tapering sides of a wedge pin 19. 20 is a plate having perforations to receive bolts by which it is secured in place in a corresponding groove or kerf in the carousel arm and having a bent reduced tongue 21 slotted, as indicated, at 22.

In assembling the parts the sections of the cornice are brought together so that the attached plates 13 and 14 will meet, the tongue 16 fitting in the recess 15. Then the arm of the carousel and the cornice sections are brought together, the tongue 21 passing through the slot in the tongue 16. The wedge shaped key 19 is pushed through the slot 22 of the projecting tongue 21 and driven down. As it drives down one inclined wall will engage the projections 17, 18, so that the two sections are drawn together laterally, the tapering opposite side of the wedge permitting this action.

This wedge shaped key is also tapered at the bottom for a slight distance so that as it drives home the wedge will more tightly draw together the plates and the lock plate, the combined action serving to draw the parts together laterally and longitudnally and thus make a secure lock which may be readily taken apart.

The described elements enable three parts to be secured together. Taking them in order, the first plate 13 is carried by the first part 10; the second plate 14 is carried by the second part 11; and a third plate 20 with its bent tongue 21 is carried by the third part 12.

Inasmuch as the tongue 16 has something of the function of a hasp I will designate it in the claims as a hasp-tongue and refer to the tongue 21 as a staple-tongue.

I claim:—

1. In a lock for joining sectional rims and carousel arms and similar structures, the combination of complementary plates, a recess in one plate and a hasp-tongue in the other plate fitting the recess, a slot in the hasp-tongue, projections on one of the plates, a staple-tongue passing through the slot in the hasp-tongue, and a wedge shaped key passing through the slot in the staple-tongue and engaging the projections.

2. In a lock for sectional rims and carousel arms and similar structures, the combination of a plate having a slot, a plate having a tongue to pass into the slot in the other plate and having a slot in its end, projections on one of the plates whose faces are in different planes, a staple-tongue passing through the slot in the plate tongue, and a wedge-shaped key passing through the slot in the tongue and engaging the faces of the projections.

3. In a lock for joining three parts, the combination of a recessed plate carried by one part, a plate on the second part having a tongue fitting the recess in the first part and slotted, a plate carried by the third part and having a tongue passing through the slot in the second part, bearings on the first part and a key passing through the slot in the tongue of the third plate and engaging the bearings on the first plate.

In testimony whereof I have hereunto signed my name.

CHARLES H. BOWDITCH.

Copies of this patent may be obtained for five cents each, by addressing the "Commissioner of Patents, Washington, D. C."